Aug. 6, 1957 R. H. HARWOOD 2,802,068

SYSTEM OF IMPEDANCE MATCHING UTILIZING GROUNDED-GRID AMPLIFIER TERMINATION

Filed May 11, 1953

INVENTOR.

ROBERT H. HARWOOD

BY George Lipkin

George E. Pearson

ATTORNEYS

United States Patent Office 2,802,068

Patented Aug. 6, 1957

2,802,068

SYSTEM OF IMPEDANCE MATCHING UTILIZING GROUNDED-GRID AMPLIFIER TERMINATION

Robert H. Harwood, San Diego, Calif., assignor to the United States of America as represented by the Secretary of the Navy Application May 11, 1953, Serial No. 354,437

1 Claim. (Cl. 179—171)

(Granted under Title 35, U. S. Code (1952), sec. 266)

The invention described herein may be manufactured and used by or for the Government of the United States of America for governmental purposes without the payment of any royalties thereon or therefor.

This invention relates generally to impedance matching systems, methods, circuits or arrangements and more particularly to an impedance matching arrangement suitable for use with any passive electric network which requires resistive termination. By the expression passive electric network is meant a network such, for example, as a filter which does not include a source of energy. The term termination as employed hereinafter refers to either one or both circuits at the input and output of the passive network, respectively, except when the termination at the input is specfically referred to as the feed or the feed circuit.

Certain impedance matching circuits heretofore employed with standard filters have not been found to be entirely satisfactory in service due to the lack of uniformity of the filter in its attenuation on both ends of the frequency range and also due to the inability of the circuits to provide adequate impedance matching when complex wave forms are encountered. In certain prior art cases, for example, impedance matching is accomplished to some extent by terminating a filter with a characteristic resistor from which the grid of a tube is fed. This arrangement has the disadvantage, however, of placing the grid-to-cathode capacitance in parallel with the termination resistor with the result that the combined or effective termination is a complex impedance including capacitive reactance which obviously is frequency sensitive. In other cases in which the grid must be isolated from the filter, the isolating capacitor is in series with the grid-leak resistor, and both are in parallel with the grid-to-cathode capacitance, with the result, as before, that the effective termination is a complex impedance and therefore frequency sensitive, i. e., susceptible to phase shifts in response to changes in frequency.

In accordance with the impedance matching arrangement of the present invention, the disadvantages of the prior art circuits have been obviated by the provision of both feed and termination circuits for the passive network which are purely resistive and therefore have zero phase shift within the operating range thereof. As a result of this arrangement, complex waveforms can be handled without disturbing the phase relationship between the in-phase and out-of-phase components of the signal. By in-phase and out-of-phase components is meant the fundamental and various harmonics of a complex waveform.

Specifically, the feed circuit of the present invention comprises a cathode follower input to the passive network in which the cathode follower is designed to match the input impedance of the filter within standard engineering limits and to provide operation of the tube of the circuit over the linear range thereof whereby the effective output impedance of the cathode follower circuit is a simple resistance and therefore not frequency sensitive. The cathode follower feed also has the advantage of presenting a high input impedance to the signal and consequently places a very light load on the signal source.

The termination circuit of the present invention comprises a grounded-grid amplifier which thus provides an input impedance identical with the output impedance of a cathode follower with a plate load resistor. Since this impedance is a simple resistance when the amplifier tube is operated within the linear range thereof, the termination circuit is therefore not frequency sensitive. The grounded-grid amplifier termination, in addition, provides amplification of the signal such that the overall gain may be substantial in some cases and at least sufficient to compensate for most losses in the passive network.

An object is to provide a new and improved method of impedance matching for passive electric networks.

Another object is to provide impedance matching for passive electric networks requiring resistive termination in which the feed and termination have almost zero phase shift within the operating range thereof.

Another object is to provide an impedance matching arrangement for a passive electric network in which the effective impedances of the feed and termination circuits therefor are simple resistances and therefore not frequency sensitive.

A still further object resides in the provision of an impedance matching circuit for a passive electric network which is capable of handling complex waveforms without disturbing the phase relationship between the in-phase and out-of-phase components.

Still another object is to provide an impedance matching circuit for a passive electric network in which the impedance matching circuit is not frequency sensitive, presents a high impedance to the signal, and provides overall gain sufficient to compensate for losses in the network.

A still further object is to provide an impedance matching circuit for a standard filter which provides uniform attenuation of the filter on both ends of the frequency range thereof.

Other objects and many of the attendant advantages of this invention will be readily appreciated as the same becomes better understood by reference to the following detailed description when considered in connection with the accompanying drawings wherein:

Fig. 1 discloses a prior art impedance matching system in diagrammatic form;

Figure 3:
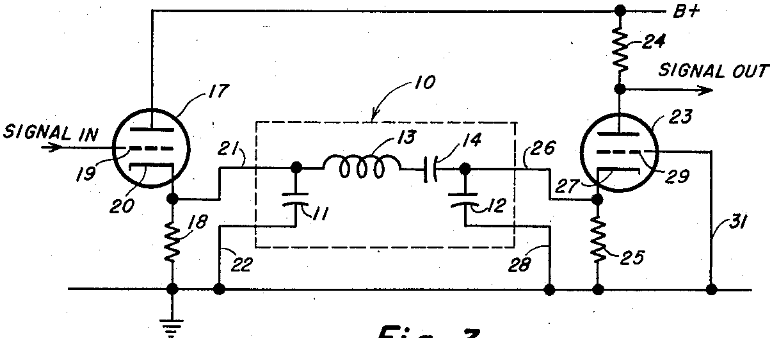
Fig. 3 is a view similar to Fig. 2 in which the passive electric network is shown to be a standard band pass filter.

Referring now to the drawings wherein like characters of reference are employed throughout the several views to designate the same or similar elements, the numeral 10 generally designates a passive electric network which, as disclosed in Fig. 3 by way of example, is a standard band pass filter comprising shunt capacitors 11 and 12, a series choke 13, and a series capacitor 14.

Figure 1:
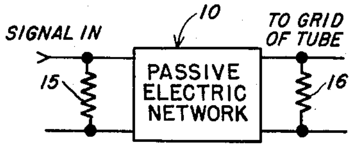

In the prior art arrangement of Fig. 1, the signal is applied across the resistor 15 which constitutes the feed to the network 10. Resistor 15 is made equal to the input impedance $Zi$ for optimum utilization of the network. In this case, the termination is also a resistor 16 which is made equal to the output impedance $Zo$ of the network. Resistors 15 and 16 have values equal to the characteristic impedance of the network termination. In common usage, the input and output impedances of the network are usually equal such that $Zi=Zo$.

The effective termination impedance of Fig. 1 is not resistive, however, when as in the usual case, the signal appearing across resistor 16 is applied directly to the control grid of a tube or by way of an isolating capacitor and grid-leak resistor, as aforementioned. In such case, the combination of the isolating capacitor and grid-leak resistor and/or the grid-to-cathode capacitance of the tube constitute a complex network including capacitive reactance which thus produces shifts in phase of the signal in response to changes in frequency with the result that, in the case of a filter for example, mis-matching occurs between the in-phase and out-of-phase components of the signal and, consequently, the attenuation of the signal traversing the filter is not uniform on both ends of the frequency range. This non-linearity of attenuation is due to mis-match at the ends of the filter. The desired attenuation is only that for which the filter is designed. In the cases of low-pass and high-pass filters, it is desired that the non-linearity should be exactly that designed for the filter network.

Figure 2:
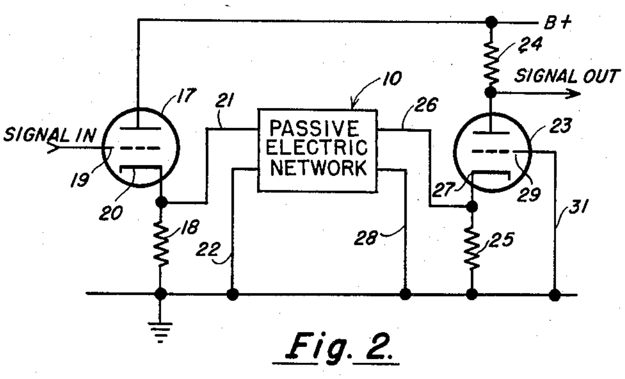
Fig. 2 is a diagrammatic view of the impedance matching system of the present invention.

In Figs. 2 and 3, the feed to network 10 is a cathode follower circuit comprising tube 17 and a grounded cathode load resistor 18, the signal being applied to the control grid 19 and the input to the filter being connected by conductors 21 and 22 across resistor 18. As is well known, the cathode follower circuit presents a high input impedance to the signal and thus constitutes a low drain on the signal source.

It will be noted that the cathode follower circuit does not include a plate load resistor and thus the output impedance thereof, designated $Zo$, which of course is made equal, within engineering limits, to the input impedance of the network 10, may be expressed by:

$$Z_o=\frac{R_K R_{KL}}{R_K+R_{KL}}=\frac{1}{\frac{1}{R_{KL}}+\frac{1}{Rp}+Gm}$$

Where $R_{KL}$ is the cathode load resistor 18, $Rp$ is plate resistance and $Gm$ is transconductance of tube 17, and $R_K$ is the impedance looking into the cathode 20 of tube 17 or approximately $1/G$, G being the total transconductance of the tube. (In the case of a pentode $G$=transconductance to plate $Gm$ plus transconductance to screen $Gs$; in the case of a triode $G=Gm$.)

$R_K$ may be expressed in terms of $Gm$, $Rp$, and the amplification factor $\mu$ of tube 17 as follows:

$$R_K=\frac{\frac{1}{Gm}}{1+\frac{1}{\mu}}=\frac{1}{Gm+\frac{1}{Rp}}$$

In the case where the cathode load resistor is very large compared with the impedance $R_K$ looking into the cathode, the impedance $Zo$ is approximately equal to $R_K$. This condition does not often exist when matching filters, so the load resistor must usually be taken into account.

The termination for network 10 is a grounded-grid amplifier comprising tube 23 and plate load resistor 24 and cathode resistor 25 therefor. It will be noted that one side 26 of the output of network 10 is connected to the cathode 27 of tube 23 and the other side is grounded by conductor 28. It will be noted further that the grid 29 of tube 23 is also grounded as by conductor 31.

The input impedance of the grounded-grid amplifier termination for network 10 is the same as the output impedance of a cathode follower with a plate load resistance. This impedance, designated $Zi$, is made equal, within engineering limits, to the output impedance of the network 10 and is expressed by the following equation:

$$Zi=\frac{R_K R_{KL}}{R_K+R_{KL}}=\frac{R_L+Rp}{1+Rp\left[Gm+\frac{1}{R_{KL}}\right]+\frac{R_L}{R_{KL}}}$$

where $R_{KL}$ is cathode resistor 25, $R_L$ is plate load resistor 24, $Rp$ is plate resistance and $Gm$ the transconductance of tube 23, and $R_K$ is the impedance looking into the cathode 27 of tube 23.

As in the case of the cathode follower circuit including tube 17, the cathode resistor $R_{KL}$ must be taken into account in calculating the impedance $Zi$ when accuracy is required for the matching.

The equation for $R_K$ is as follows:

$$R_K=\frac{1}{Gm}\left[\frac{1+\frac{R_L}{Rp}}{1+\frac{1}{\mu}}\right]=\frac{1+\frac{R_L}{Rp}}{Gm+\frac{1}{Rp}}$$

where $\mu$ is the amplification factor for tube 23.

It will be apparent from the foregoing equations that, when the feed and termination circuits are designed to operate within the linear ranges of tubes 17 and 23 respectively, all of the values are simple resistances and, hence, the feed and termination circuits are not frequency sensitive and have substantially zero phase shift.

Figure 4:
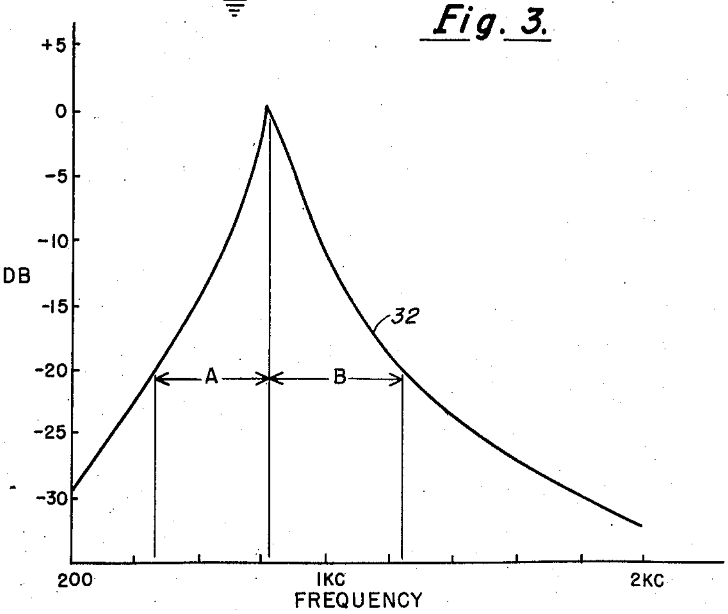
Fig. 4 is a graph illustrating the frequency response of the filter of Fig. 3.

Moreover, it will be apparent that this zero phase shift condition allows complex waveforms to be handled without disturbing the phase relationship between the fundamental and the various harmonics of an applied signal. This results in improved linearity at both ends of the band pass filter of Fig. 3, for example, and improves the uniformity in its attenuation on both ends of the frequency range, as may be observed from the frequency response curve 32 of the filter disclosed in Fig. 4. It will be noted from curve 32 that approximately the same attenuation results from equal frequency deviations on either side of resonance to approximately 20 db down from maximum response, the frequency spread A being approximately equal to that of B on the opposite end of the frequency range. In other words, the frequency response for the network is the frequency response designed for the filter.

From the foregoing it should now also be apparent that the grounded-grid amplifier termination provides an overall gain through amplification of the signal which is at least sufficient to compensate for usual losses in the passive network 10. It will further be apparent that in the use of the aforedescribed feed and termination circuits the input and output impedances of the network may be of different values and these impedance matching circuits may be employed advantageously with various types of networks requiring resistive termination. Although triodes have been illustrated by way of example, it will be obvious to those skilled in the art that other tube types may be employed where their specific characteristics are required.

Obviously many modifications and variations of the present invention are possible in the light of the above teachings. It is therefore to be understood that within the scope of the appended claim the invention may be practiced otherwise than as specifically described.

What is claimed is:

In an impedance matching system of the character disclosed, the combination of a passive electric network which requires resistive termination, a cathode follower circuit connected at the output thereof to the input of said network and having an output impedance matching that of said network input and expressed by the equation $$Zo=\frac{1}{\frac{1}{R_{KL}}+\frac{1}{Rp}+Gm}$$

where $Zo$ is said output impedance, $R_{KL}$ is the cathode load resistor, and $Rp$ is plate resistance and $Gm$ is transconductance of the tube of said cathode follower circuit, and a grounded-grid amplifier connected at the input thereof to the output of said network and having an input impedance matching that of said network output and expressed by the equation $$Zi = \frac{R_L + Rp}{1 + Rp\left[Gm + \frac{1}{R_{KL}}\right] + \frac{R_L}{R_{KL}}}$$

where $Zi$ is said input impedance of the amplifier, $R_L$ and $R_{KL}$ are the plate load and cathode load resistors respectively of the amplifier and $Rp$ and $Gm$ are the plate resistance and transconductance thereof respectively.

References Cited in the file of this patent

UNITED STATES PATENTS

| | | |
|---|---|---|
| 2,356,308 | Fredendall | Aug. 22, 1944 |
| 2,398,691 | Bradley | Apr. 16, 1946 |
| 2,452,560 | Gainer | Nov. 2, 1948 |
| 2,563,245 | Jofeh | Aug. 7, 1951 |
| 2,571,045 | Macnee | Oct. 9, 1951 |
| 2,586,167 | Kamm | Feb. 19, 1952 |
| 2,586,803 | Fleming | Feb. 26, 1952 |
| 2,605,409 | Forbes | July 29, 1952 |
| 2,647,239 | Tellegen | July 28, 1953 |
| 2,728,876 | Varela | Dec. 27, 1955 |

FOREIGN PATENTS

| | | |
|---|---|---|
| 529,044 | Great Britain | Nov. 13, 1940 |